July 22, 1941.　　　　K. F. BOHN　　　　2,249,937
SPOT WELDER TIP
Filed Sept. 30, 1940
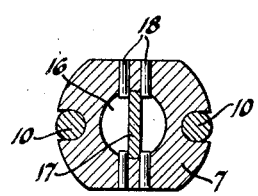
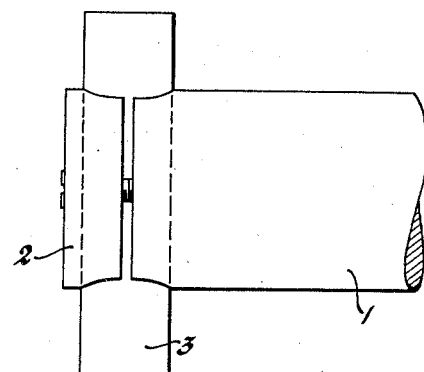
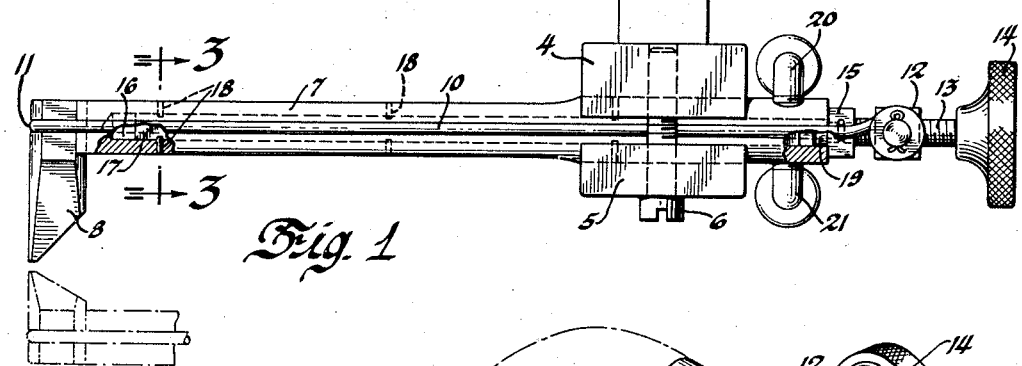
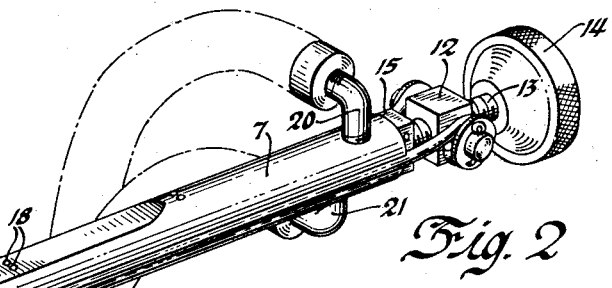
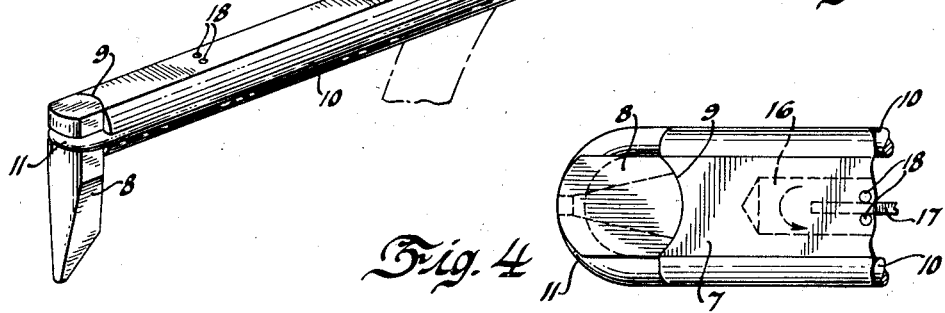
Inventor
Karl F. Bohn
By
Blackmore, Spencer & Flint
Attorneys Patented July 22, 1941

2,249,937

UNITED STATES PATENT OFFICE 2,249,937

SPOT WELDER TIP

Karl F. Bohn, Lockport, N. Y., assignor to General Motors Corporation, Detroit, Mich., a corporation of Delaware Application September 30, 1940, Serial No. 358,968

4 Claims. (Cl. 219—4)

This invention relates to an improved welding tip and holder assembly designed to eliminate difficulties experienced in spot welding interior baffles, filler necks and other appurtenances to tanks of automobile radiators. To reach into restricted space often presented, electrode rods of proper length have been forged to special shapes so as to establish welding contact at the necessary points. In factory production with the welding apparatus in continuous use the tips need to be reforged from time to time, particularly because of the lack of stiffness and also because of accelerated wear resulting from poor cooling.

It is an object of the present invention to provide a sturdy but compact tip and holder assembly for use in close quarters with provision for carrying away excess heat and which will have a long life and need a minimum of attention in use.

A further object is to provide a simple and inexpensive tip structure arranged to be mounted securely but replaceably on the free end of a projecting holder, the interconnection keying the parts against dislodgment but enabling quick interchangeability and the holder having circulating passages for the flow of cooling fluid to immediately adjacent its tip seat.

Additional objects and advantages will become apparent during the course of the following specification having reference to the accompanying drawing wherein Figure 1 is an elevation of the improved tip and holder assembly mounted for use; Figure 2 is a perspective view of the assembly; Figure 3 is a detail sectional view on line 3—3 of Figure 1 and Figure 4 is a top plan view on a large scale of the tip and free end of the holder.

In the drawing the numeral 1 indicates a supporting arm having a cooperating cap piece 2 for holding in place a vertically adjustable rod 3 which in turn carries at its lower end a head 4 having a clamp plate 5 secured thereto by studs 6 for mounting the outer end of an electrode supporting rod or holder 7. An electrode or welding tip 8 extends laterally from the inner end of the rod 7 for cooperation with a complementary electrode assembly indicated by broken lines in Figure 1. As will be obvious the electrode tip may be adjusted to various positions through the settings of the clamp plates 2 and 5. The electrode 8, which may be formed from a solid piece of copper rod machined to shape, has one end converging to the welding tip or point and the portion adjacent its other end formed for interlocking connection with the free end of the supporting rod 7.

For this purpose the free end of the rod 7 is formed with an arcuate seat, indicated at 9, to receive a similarly shaped seating surface of the electrode 8 and is also provided with a pair of diametrically opposite axially extending grooves at the sides to receive the legs 10 of a hairpin shaped wire retainer whose bight 11 embraces the electrode 8 and is fitted into a peripheral groove in the side of the electrode opposite its rod engaging seat. The hairpin retainer not only holds the parts in seating engagement and against lateral displacement but by reason of its reception within the keyways or grooves mentioned, locks the electrode against dislodgment in the direction of its axis. Immediately adjacent the bight or loop 11 the wire retainer straightens out to form the legs 10—10 and these straight portions engage oppositely disposed flats or side faces on the electrode 8 whereby turning of the electrode on its axis is prevented.

For adjusting and anchoring the hairpin retainer the free ends of its legs 10 are curled to form eyes which are fitted to lateral pins on the nut 12 threaded on the adjusting screw 13. At one end the adjusting screw carries a hand wheel 14 and at its opposite end has a bearing block 15 engaging the outer end of the rod 7. Rotation of the hand wheel or knob 14 in one direction tensions the legs 10 of the hairpin retainer for securely anchoring the electrode to its holder while rotation in the opposite direction shifts the retainer in the rod keyways to move the bight 11 away from the seat 9 when replacement of the electrode tip is necessary.

Heat from the solid electrode 8 is transferred through the seat 9 and is carried away by cooling liquid circulating through the rod. To provide circulating passages the rod 7 is drilled from its outer end to a point adjacent the seat 9 forming a circular opening or hollow space 16 throughout the rod. This space is divided into two channels by a baffle or partition wall 17 extending through the hollow rod 7 from its outer end to a point spaced or stopped short of the inner end of the passage 16 for communicating the channels on opposite sides of the wall 17. A convenient way of locating the wall 17 is to project at given intervals a pair of spaced pins 18 through the wall of the hollow rod 7 and into the interior passageway on both sides of the dividing wall as best shown in Figure 3.

The outer end of the passageway is closed by a stopper or plug 19 and a pair of elbow fittings 20 and 21 are provided to communicate the respective channels with flexible hose or conduits for the incoming and outgoing cooling liquid.

In the structure described, the electrode tip is free of water passages and hence there are no joints to pack and no danger of liquid leakage near the point of welding. Because the solid copper tip is comparatively small and with adequate cooling through the holder, excessive working temperature of the tip is avoided and even in continuous use the electrode becomes only moderately warm and this results in long life without frequent filing and reshaping of the point, except for an occasional brushing with emery cloth to clean the point. Through the use of a stiff holder which lasts indefinitely, less material is needed for the interchangeable welding tips and the whole assembly being compact, as well as adjustable for a great variety of work, perfect welds are obtained in spite of limited working space and accumulation of surface dirt.

I claim:

1. In a welding device, a supporting rod having a passage therein for the circulation of cooling fluid, a laterally extending welding tip seated at the inner end of said rod and means replaceably securing the tip on the rod including a hairpin member having its bight fitted within a peripheral recess in the tip and its side legs fitted within axially extending recesses in the rod, an axially adjustable nut connected with said legs and a hand screw having screw threaded engagement with the nut and bearing on the outer end of said rod.

2. In a welding device, a supporting rod having a reentrant seat at its inner end, an electrode fitted in said seat and having a flat side, a clamping member having a straight portion engaging said flat side and projecting outwardly within an axial groove in the rod, a key formation at the inner end of the member embracing the electrode and fitting a peripheral groove therein and adjustable means at the outer end of the rod secured to the member for maintaining said parts in assembled relation.

3. In a welding device, a relatively long and narrow electrode supporting rod having longitudinal guide formations in the opposite sides thereof, means mounting the same at its outer end, an electrode seat at its inner end, a hairpin clamp keyed in said guide formations and adjustable therein longitudinally of the rod and a replaceable electrode embraced by the bight of said clamp and held thereby on said seat, said electrode having oppositely disposed flat side faces engaging the hairpin clamp to resist rotational displacement and a peripheral key formation interlocking with the hairpin to resist axial displacement thereof.

4. In a welding device, an electrode supporting rod having an electrode seat at its inner end and a pair of axially extending grooves on opposite sides thereof, a hairpin shaped electrode retainer having its legs closely fitted to said grooves and its bight cooperating with said seat to clamp a replaceable electrode tip thereto, a laterally projecting electrode tip engaging said seat and having a peripheral locating groove receiving the embracing bight of the retainer to key the tip and rod against relative displacement axially of the tip and means connected with the retainer legs for shifting the bight relative to said seat.

KARL F. BOHN.